(No Model.)  2 Sheets—Sheet 1.

W. H. HOWLAND.
Machine for Crushing and Pulverizing Ores.

No. 236,497.  Patented Jan. 11, 1881.

Figure 1:
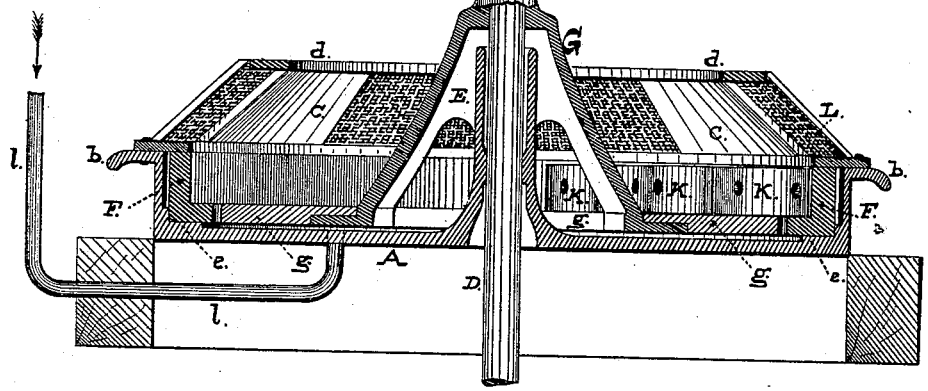

One-half plan-view, through x x, fig. 1.

Witnesses:  Inventor:
Jno. L. Boone  William H. Howland
Wm. H. Clark  by his Attys.,
  Boone & Son (No Model.) 2 Sheets—Sheet 2.
W. H. HOWLAND.
Machine for Crushing and Pulverizing Ores.
No. 236,497. Patented Jan. 11, 1881.
Fig. 3.
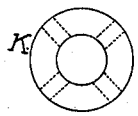
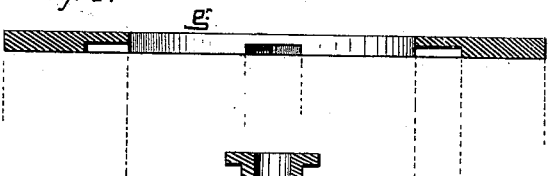
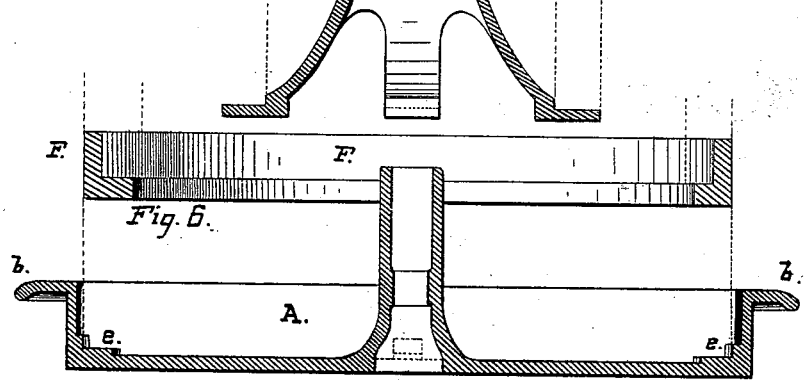
Witnesses:
Jno. L. Boone
Wm. F. Clark
Inventor:
William H. Howland,
by his Attys.,
Boone & Osborn

UNITED STATES PATENT OFFICE.

WILLIAM H. HOWLAND, OF OAKLAND, CALIFORNIA.

MACHINE FOR CRUSHING AND PULVERIZING ORES.

SPECIFICATION forming part of Letters Patent No. 236,497, dated January 11, 1881.

Application filed May 31, 1880. (No model.)

*To all whom it may concern:*

Be it known that I, WILLIAM H. HOWLAND, of Oakland, Alameda county, in the State of California, have invented an Improved Machine for Crushing and Pulverizing Ores; and I do hereby declare that the following is a full, clear, and exact description thereof, reference being had to the accompanying drawings.

My invention relates to an improved machine for crushing and pulverizing ores; and it consists of a pan which is provided with a peripheral die and a driving-muller, and in which a continuous circuit of short cylinders or rollers are placed so that the rotation of the muller will cause them to revolve and travel against the die. The ore is fed into the center of the pan, and is thrown outward by the centrifugal action against and between the crushing and grinding rollers, by which it is reduced to a powder. The pan is provided with a screen for discharging the pulp, and when water is used it is fed into the pan underneath the muller, all as hereinafter more fully described.

Figure 2:
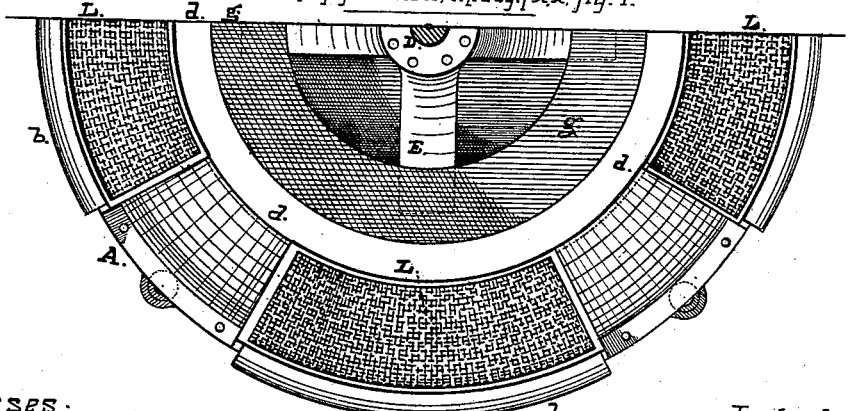

Referring to the accompanying drawings, Figure 1 is an elevation in vertical section. Fig. 2 is a one-half view below line *x x*, Fig. 1. Fig. 3 shows details of the crushing and grinding cylinder. Figs. 4 and 5 are detail sections of the rotating muller and its ring. Fig. 6 shows the pan and the stationary ring in section.

Let A represent a shallow pan, the rim of which has a flange, *b*, projecting outward around its upper edge, so that a sloping top or cover, C, can be secured upon it. This sloping top has a narrow horizontal rim, *d*, extending from its upper edge inward toward the center of the pan, so that the top and flange cover only the outer portion of the pan, leaving the center open.

D is a vertical spindle by which a muller, G, is driven. This spindle passes up through the bottom of the pan, and is driven by power applied to it underneath the pan in the manner of operating mullers in amalgamating-pans.

The rim of the pan is cast with ribs or lugs *e* at intervals on its inside, which lugs are extended horizontally a short distance along the bottom of the pan, thus forming a rectangular bearing, on which I place an annular die, F, so that the lower rim of the die will rest on the horizontal lugs, while its outside bears against the vertical lugs. This die I make of chilled iron or steel and quite heavy, so that it will sustain the wear and strain to which it is subjected. The die is rectangular in cross-section, and extends entirely around the pan, forming a stationary track, as hereinafter described.

The muller G is made with a plane bottom portion, *g*, which may either be a permanent part of the muller or simply a plate to which the muller is attached. The muller is adjustable up or down, like the muller of an amalgamator, by means of the screw *h* and handwheels *i j*, so that it can be raised clear of the bottom of the pan. The upper face of the muller-bottom *g* will then be on a plane with the upper face of the horizontal portion of the annular die. Upon the bottom of the muller I place a number of short cylinders, K K K, upon end, so that when the muller is rotated these cylinders will assume position one behind the other in a circuit around the pan, as shown at Fig. 1. I shall usually employ a sufficient number of cylinders to form two concentric series, the cylinders in the outside series or circle being larger than those of the inside series; but usually a single circle will answer every purpose. A portion of each cylinder in the outer circle will then rest upon the horizontal portion of the stationary die, and a portion will rest upon the outer rim of the traveling muller, so that the rotation of the muller will cause them to simultaneously rotate and move around the inside of the pan, one behind another, while the centrifugal force will cause them to press outward against the vertical face of the die. The cylinders K are provided with perforations, as shown in Figs. 1 and 3, to permit of the escape of any pulp that may get into the cylinders and enable the convenient handling of the cylinders as they are introduced and removed from the pan, as occasion may require. They, however, are not necessary in the operation of my invention.

*l* is a water-pipe, which passes up through the bottom of the pan, so as to supply the required amount of water. The water is introduced underneath the muller, so as to lubricate and buoy it up, thus causing it to run much easier than if the water were introduced above the muller. The water-pressure under the muller also prevents the pulp or particles of ore from getting underneath the muller.

In openings in the sloping cover C, I will secure the screens L, so that the splash against them will discharge the pulp from the pan as fast as it is ground fine enough to pass through the screens; or, if preferred, an upward current-discharge could be provided between the die F and rim of the pan; but both of these methods of discharging pulp from crushing-mills are old, and can be applied by any skillful mechanic.

In the space between the die F and rim of the pan I place amalgamated plates. Usually I shall place one plate on each side of the space, so that the pulp as it moves upward or downward between the die and rim will be brought in contact with the plates.

The great feature of my invention is the cylinders or rollers placed loosely in a pan, which is provided with a die, F, said rollers being caused to rotate and follow each other in a circle around the track of the die by the rotation of the muller, in combination with a suitable screening device. The rollers thus operated present a large amount of grinding-surface, as their rotation causes their lower ends to grind against the die and muller, while their sides serve as crushers to crush the ore which is caught between them and against the die.

I shall usually employ two circles of rollers. The inner circle will then impinge and grind against the outer circle, and the entire number of cylinders will travel together. The cylinders, as stated, are short, and they may either be made solid or hollow.

The muller is driven by power applied to the vertical shaft D below the pan, in the ordinary manner of driving the mullers of amalgamating-pans. The ore is introduced into the pan through the opening in the cover, and is instantly hurled by centrifugal force outward into and among the rotating and moving cylinders, by which it is crushed and ground to a powder. The water is also carried to the periphery by the same force, so that as fast as the ore is ground sufficiently fine it passes through the screens or other discharge. A large portion of the pulp will pass between the die and rim of the pan, where any free particles of gold contained in it will be arrested and caught by the amalgamated surfaces; and as a free circulation is kept up from the interior of the pan through the space behind and under the die, all large particles that fail to pass through the screens and get into the space behind the die will settle downward and be drawn up under the rollers by the action of the water and rollers, thus providing for complete pulverization of every particle. The action of the rollers or cylinders upon the ore is positive and instantaneous, and as the screens are placed above the crushing-rolls nothing can escape the action of the rolls until it has been ground fine enough to pass through the screens, because the particles must always fall back into the rolls if they are too large to pass through the screens, and the same result will happen if the upward current discharge is used.

Having thus described my invention, what I claim, and desire to secure by Letters Patent, is—

1. The pan A, having the annular die F placed on its bottom, inside of its rim, said die being rectangular in cross-section, in combination with the muller G, with its plane bottom, and one or more circles of rollers or short cylinders, K K K, substantially as described, and for the purpose set forth.

2. The pan A, with its sloping cover C, in which screens L are arranged, in combination with a series of crushing and grinding rollers or cylinders, K, which are driven by a muller, G, inside of said pan, substantially as specified.

3. In a machine for pulverizing ores, the pan A, having the water-supply pipe $l$ of an approximate U shape with one arm extending above the pan, and the other arm passing up through the bottom of the pan, substantially as and for the purpose set forth.

Witness my hand and seal this 24th day of April, A. D. 1880.

WILLIAM H. HOWLAND. [L. S.]

In presence of—
WM. F. CLARK,
EDWARD E. OSBORN.